UNITED STATES PATENT OFFICE.

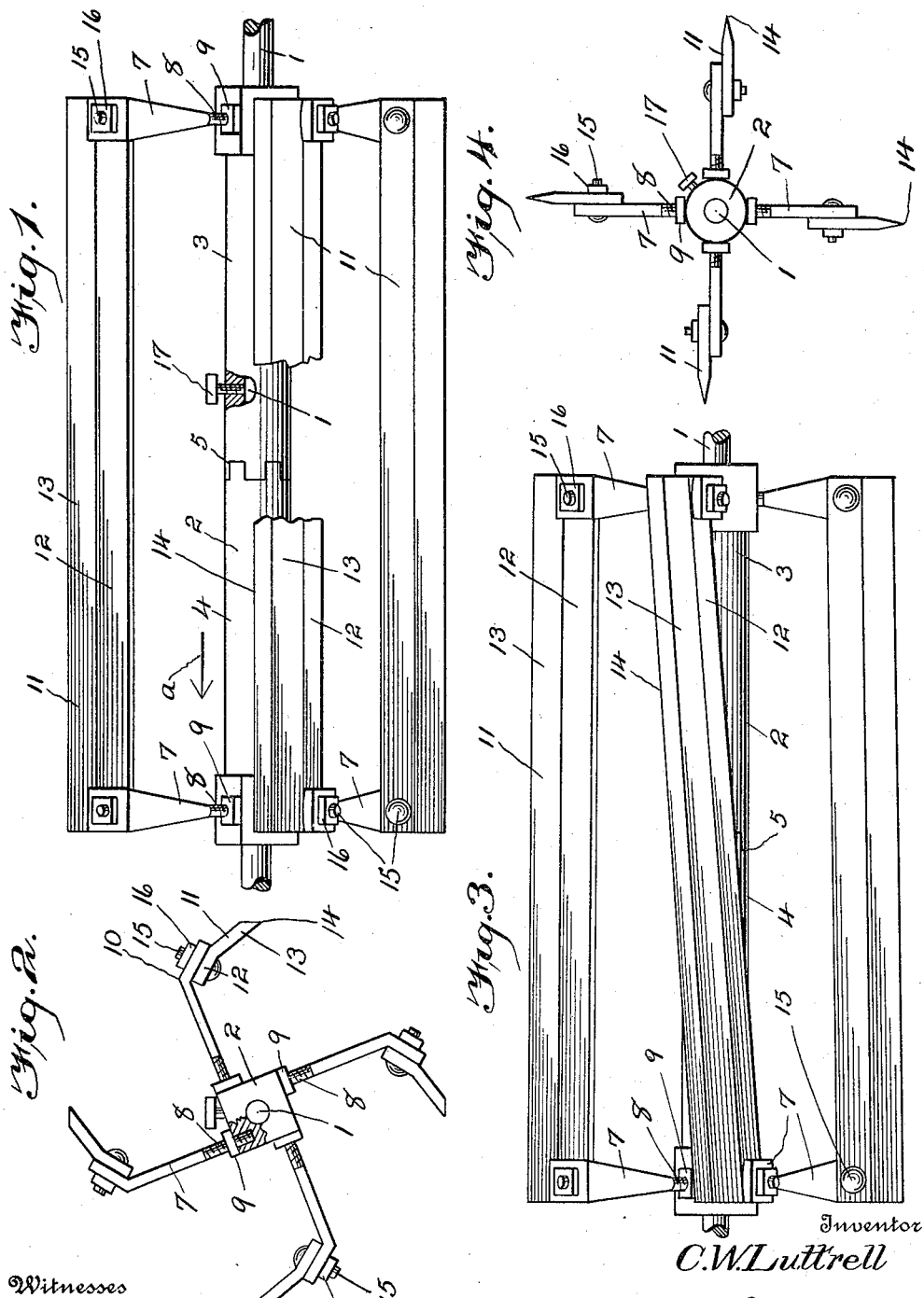

CHARLES W. LUTTRELL, OF BRONTE, TEXAS.

STALK CHOPPING OR CUTTING ROLLER.

1,128,337. Specification of Letters Patent. Patented Feb. 16, 1915.

Application filed May 20, 1914. Serial No. 839,808.

*To all whom it may concern:*

Be it known that I, CHARLES W. LUTTRELL, a citizen of the United States, residing at Bronte, in the county of Coke and State of Texas, have invented a new and useful Stalk Chopping or Cutting Roller; and I do hereby declare the following to be a full, clear, and exact description of the invention, such as will enable others skilled in the art to which it appertains to make and use the same.

This invention relates to a new and useful stalk chopper or cutter roller.

An object of the invention is to provide an improved device of this nature, which is simple and efficient in construction, and may be manufactured very cheaply.

One of the features of the invention is to provide a revolving cutter of such a construction that the radial arms thereof will yield incident to coming in contact with the stalks, and in which the free ends of the arms are disposed at angles to which the cutting blades are attached, which blades are likewise angular in cross section.

A further object of the invention is to provide means such as sleeves, one at each end of the cylinder and designed to carry the radial arms, and which are so arranged on a tubular member of the cylinder, as to be adjusted annularly on the tubular member, whereby the cutting blades or knives may be twisted or disposed at an angle axially to the shaft of the roller, in order to permit the cutting blades or knives to have a shearing action on the stalks.

In practical fields the details of construction may be subjected to alterations, falling within the scope of what is claimed.

The invention comprises further features and combination of parts, as hereinafter set forth, shown in the drawings and claimed.

In the drawings:—Figure 1 is a view in side elevation of the improved cutting cylinder or roller constructed in accordance with the invention. Fig. 2 is an end elevation. Fig. 3 is a view in side elevation, illustrating the cutting blades or knives twisted or disposed at an angle. Fig. 4 is an end elevation showing the arms of the reel extending exactly radially, and the angular ends of the arms eliminated.

Referring to the drawings, 1 designates the usual shaft on which the cylinder or cutting roller is mounted and adapted to rotate therewith. This cutting roller or cylinder comprises a tube 2 consisting of two sleeved sections 3 and 4 united or connected together as at 5, by means of the gear teeth or toothed connections. The outer ends of the sleeve sections are provided with arms 7, threaded in place as at 8 and having lock nuts 9. These arms taper toward the sleeve sections, as shown in order to make them thin enough, whereby the arms may yield incident to the cutting knives or blades coming in contact with the stalks. The outer ends of the arm are broader than the inner portions thereof, and are angularly disposed with the body of the arms, as shown at 10. These angularly disposed end portions carry the cutting blades or knives 11, which on cross section, are also angular, the part 12 of each of said blades is secured to the angular ends of two of the arms, that is, one at each end, while the portion 13 of the cutting blade or knife has a cutting edge 14. Bolts and nuts 15 and 16 are utilized for fastening the cutting blades or knives to the angular portions of said arms. A set screw or the like 16 is utilized for fastening the sleeve section 3 to the shaft 1, which forms a part of a stalk chopping machine. In order to dispose the cutting blades or knives angularly as shown in Fig. 3, the sleeve section 4 may be moved axially in the direction of the arrow *a*, thereby springing the arms connected to the sleeve section 4 slightly, the sleeve section 4 may then receive a partial annular or rotary movement and allowed to spring back, so that the connections 5 will reëngage. In this manner the cutting blades or knives may be arranged angularly as shown in Fig. 3, so that they may have a shearing action on the stalks. It will be observed that this angular arrangement may be increased or decreased, so that the shearing action may be correspondingly increased or decreased. Furthermore, it will be observed that only one set screw or the like 16 is necessary to hold the sleeve sections in place. In other words, the said screw holds one section in place, while the connections 5 cause the other sleeve section to rotate with its adjoining sleeve section. By the angular arrangement of the end portions of the arms and the angular construction of the blades, said blades are disposed in the proper position, when the cylinder or roller is rotating, in order to sever or cut the stalks. In Fig. 4 the arms are arranged radially, and the angular portion of the arms and the knives are dispensed with.

In practice the shaft of the cultivator (not shown) may be extended on one side of the machine, or on each side in order to accommodate three stalk cutters, in order to cut three rows at once.

For the purpose of illustration there are only four knives shown, but it is to be understood that six or more may be used.

The invention having been set forth, what is claimed as new and useful is:—

1. In a cutting roller or cylinder, a shaft, a tubular member on the shaft comprising two sleeve sections having their adjacent ends provided with gear tooth connections thereby uniting the sleeve sections axially on the shaft, means for securing one section to the shaft, the outer ends of the sleeve sections having arms, and cutting blades or knives secured to the outer ends of said arms.

2. In a cutting roller or cylinder, a shaft, a tubular member secured on the shaft to rotate therewith, the outer ends of the tubular member having arms, blades secured to the outer ends of said arms, said tubular member comprising two sections having axially uniting means whereby one section may be adjusted annularly to dispose the cutting blades at different angles so as to produce a shearing action.

3. In a cutting roller or cylinder, a shaft, a tubular member secured on the shaft to rotate therewith, arms projecting radially from the opposite ends of the tubular member, said arms being tapered toward the tubular member and being resilient and having angular ends, cutting blades or knives angular in cross section, means for securing the blades to the angular ends of the arms, said tubular member comprising two sections having axially uniting means whereby one section may be adjusted annularly to dispose the cutting blades at different angles so as to produce a shearing action.

In testimony whereof I have signed my name to this specification in the presence of two subscribing witnesses.

CHARLES W. LUTTRELL.

Witnesses:
W. J. CUMTER,
J. D. IVEY.

Copies of this patent may be obtained for five cents each, by addressing the "Commissioner of Patents, Washington, D. C."